US012158347B1

(12) United States Patent
Tsai et al.

(10) Patent No.: US 12,158,347 B1
(45) Date of Patent: Dec. 3, 2024

(54) MULTI-OBJECTIVE PATH PLANNING METHOD FOR INTELLIGENT PUBLIC TRANSPORT SYSTEM

(71) Applicant: Xiamen King Long United Automotive Industry Co., Ltd., Xiamen (CN)

(72) Inventors: Rong-Guei Tsai, Xiamen (CN); Liang Su, Xiamen (CN); Zhida Ke, Xiamen (CN); Chengtao Xu, Xiamen (CN); Zhiming Huang, Xiamen (CN); Honghai Li, Xiamen (CN); Zhenheng Lin, Xiamen (CN); Xuejun Chen, Xiamen (CN); Xiaolan Chen, Xiamen (CN); Delin Luo, Xiamen (CN); BaoXing Lin, Xiamen (CN)

(73) Assignee: Xiamen King Long United Automotive Industry Co Ltd, Xiamen (CN)

( * ) Notice: Subject to any disclaimer, the term of this patent is extended or adjusted under 35 U.S.C. 154(b) by 0 days.

(21) Appl. No.: 18/420,791

(22) Filed: Jan. 24, 2024

(51) Int. Cl.
*G01C 21/34* (2006.01)
*G06Q 50/40* (2024.01)
*G08G 1/00* (2006.01)

(52) U.S. Cl.
CPC ....... *G01C 21/343* (2013.01); *G01C 21/3446* (2013.01); *G06Q 50/40* (2024.01); *G08G 1/202* (2013.01)

(58) Field of Classification Search
CPC .. G01C 21/343; G01C 21/3446; G06Q 50/40; G08G 1/202
See application file for complete search history.

(56) References Cited

U.S. PATENT DOCUMENTS

| 8,494,771 | B2* | 7/2013 | Delling | G06Q 50/14 701/533 |
|---|---|---|---|---|
| 2008/0027772 | A1* | 1/2008 | Gernega | G06Q 10/04 705/7.26 |
| 2013/0158846 | A1* | 6/2013 | Zhang | G08G 1/127 701/117 |
| 2019/0068434 | A1* | 2/2019 | Moreira da Mota | H04L 41/40 |

(Continued)

FOREIGN PATENT DOCUMENTS

| CN | 109409599 B | * | 2/2022 | .......... G06Q 10/047 |
| CN | 116029470 A | * | 4/2023 | |
| CN | 116882605 A | * | 10/2023 | |

*Primary Examiner* — Peter D Nolan
*Assistant Examiner* — Demetra R Smith-Stewart
(74) *Attorney, Agent, or Firm* — Hemisphere Law, PLLC; Zhigang Ma

(57) ABSTRACT

Provided is a multi-objective path planning method for an intelligent public transport system, includes: generating a shortest path network topology for connecting bus stops by analyzing a traffic network topology and bus drivable paths; dynamically and evenly allocate bus routes according to passenger waiting periods, road lengths, and the shortest path network topology, to thereby allocate different routes for different buses; and determining an optimal bus route configuration according to average passenger travel distances, passenger experience, and the bus routes. The method can minimize a passenger waiting period while ensuring a high passenger load rate, thereby improving the overall efficiency of the public transport system and the travel experience of passengers.

6 Claims, 7 Drawing Sheets

(56) References Cited

U.S. PATENT DOCUMENTS

2019/0265703 A1* 8/2019 Hicok ................ G05D 1/617
2021/0108934 A1* 4/2021 Dasalukunte ...... G01C 21/3461
2021/0302181 A1* 9/2021 Civitella ............ G01C 21/3461

* cited by examiner

MULTI-OBJECTIVE PATH PLANNING METHOD FOR INTELLIGENT PUBLIC TRANSPORT SYSTEM

TECHNICAL FIELD

The disclosure relates to the field of path planning technologies, particularly to a multi-objective path planning method of an intelligent public transport system.

BACKGROUND

With the rapid development of vehicle intelligence and vehicle networking industry, demands of passengers for travel experience have been increasing in recent years, and it is more important to provide more comfortable and convenient intelligent transportation services. In order to achieve this goal, it is a key factor to efficiently and scientifically schedule a route that meets the demand. However, there are various restrictions in an actual traffic environment, which makes the vehicle route planning more complicated. A traditional route planning method is based on historical experience and follows a greedy rule to plan the route. However, for bus operators, it is very important to both reduce bus operating costs and improve passenger experience. Therefore, it is urgent to propose a multi-objective path planning method for an intelligent public transport system.

SUMMARY

In order to solve the above technical problems, the disclosure provides a multi-objective path planning method for an intelligent public transport system, which can minimize waiting period of passengers while ensuring a higher load factor, thereby improving an overall efficiency of the public transport system and travel experience of passengers.

In order to achieve above purposes, an embodiment of the disclosure provides a multi-objective path planning method for an intelligent public transport system, which includes:
  generating a shortest path network topology for connecting bus stops by analyzing a traffic network topology and bus drivable paths;
  dynamically and evenly allocate bus routes according to passenger waiting periods, road lengths, and the shortest path network topology, to thereby allocate different routes for different buses; and
  determining an optimal bus route configuration according to average passenger travel distances, passenger experience, and the bus routes.

In an embodiment, the method further includes: for a route s, determining a total path length $\tau(s)$ of the route s by adding path lengths one by one according to orders in which bus stops of the route s are traversed; where the total path length $\tau(s)$ is expressed in a formula 1 with a constraint condition expressed by a formula 2:

$$\tau(s) = \sum_{i=1}^{n} \sum_{j=1}^{n} d(i,j)\varphi_{i,j}; \quad (1)$$

$$\text{s.t.} \begin{cases} \sum_{i=1}^{n} \varphi_{i,j} = 1, \text{ where } j = 1, 2, 3 \ldots, n, v_i \in V \\ \sum_{j=1}^{n} \varphi_{i,j} = 1, \text{ where } i = 1, 2, 3 \ldots, n, v_j \in V, \\ \varphi_{i,j} \in \{0, 1\}, \text{ where } i, j = 1, 2, \ldots, n \end{cases} \quad (2)$$

where i and j represent adjacent bus stops, and d(i,j) represents a distance between the bus stop i and the bus stop j; if the bus stop j is the next bus stop of the bus stop i in the route s, a binary variable $\varphi_{i,j}$ takes a value of 1, otherwise $\varphi_{i,j}$ takes a value of 0; and n represents a total bus stop number in the route s.

In an embodiment, a total passenger number in a route s is expressed as P(s), which is obtained by adding a passenger number carried at each bus stop of the route s, and is expressed $$P(s) = \sum_{i=1}^{n} C(b)_{i,j}(s), \text{ where } i \in s, \quad (3)$$

where $C(b)_{i,j}(s)$ represents a passenger number carried at a bus stop i of a bus b in the route s with a terminal bus stop j, and n represents a total bus stop number in the route s.

In an embodiment, sa passenger number on a bus b is variable, and is determined by a passenger number carried at each bus stop of a route s; and the passenger number on the bus b is determined by a formula 4:

$$\sum_{v \in s}^{n} C(b)_{i+1,j}(s) = \sum_{v \in s}^{n} C(b)_{i,j}(s) + \sum_{v \in s}^{n} B(b)_{i,j}(s) - A(b)_i(s), \quad (4)$$

where $C(b)_{i,j}(s)$ represents a passenger number on the bus b when the bus b arrives a bus stop i in the route s with a terminal bus stop j, $B(b)_{i,j}(s)$ represents a passenger number corresponding to getting on the bus b at the bus stop i in the route s with a terminal bus stop j, and $A(b)_i(s)$ represents a passenger number corresponding to getting off the bus b at the bus stop i In an embodiment, the method further includes: obtaining a passenger average waiting period $WT_{avg}$, including:
  dividing a waiting period into two periods including a regular period and a specific period, and calculating a weighted average waiting period of each of the two periods to obtain a first weighted average waiting period and a second weighted average waiting period; the first weighted average waiting period is obtained by: multiplying a waiting period $WT_r$ of the regular period and a corresponding weight $\omega_r$ to obtain a first item, and summing the first item corresponding to each passenger i from 1 to $k_1$; and the second weighted average waiting period is obtained by: multiplying a waiting period $WT_s$ of the specific period and a corresponding weight $\omega_s$ to obtain a second item, and summing the second item corresponding to each passenger j from 1 to $k_2$;
  adding the first weighted average waiting period and the second weighted average waiting period, and then is divided by $k_1+k_2$ to thereby obtain the passenger average waiting period $WT_{avg}$.

In an embodiment, the method further includes: obtaining a crowding degree $C_d(s)$ expressed in a formula 9 subject to a formula (10):

$$C_d(s) = \frac{C(b)_{i,j}(s)}{\beta(b)}; \quad (9)$$

$$\text{s.t. } C_d(s) \leq C_t(s), \forall s \in S, C_d(s) \in [0, +\infty), \quad (10)$$

where $C_t(s)$ represents a threshold, $C(b)_{i,j}(s)$ represents a passenger number on a bus b when the bus b arrives a bus stop i in a route s with a terminal bus stop j, the route s is a subset of a set of routes S, and β(b) represents a maximum capacity of bus b.

In an embodiment, the dynamically and evenly allocate bus routes according to passenger waiting periods, road lengths, and the shortest path network topology, to thereby allocate different routes for different buses specifically includes:

step 1, selecting a bus by with the smallest cost $\mathcal{C}_p$, which has a highest priority when selecting a bus stop;

step 2, selecting, $b_p$ the bus by with the highest selection priority, the bus stop with the minimum stop evaluation index λ from adjacent bus stops and adding the bus stop with the minimum stop evaluation index λ to a set $B_p$;

step 3, updating a cost $\mathcal{C}_p$ of the bus $b_p$;

step 4, in a situation that all bus stops have been allocated, if there is a route still that has not yet reached a destination bus stop, adding directly the destination bus stop to the route, and performing step 5; in a situation that there is at least one bus stop is not allocated, returning to step 1; and step 5, increasing $w_1$ with an initial value of 0 by 0.02 each time until $w_1$ reaches 1; decreasing $w_2$ 0.02 with an initial value of 1 each time until $w_2$ reaches 0; taking an optimal route result as a final path planning result, that is, a whole route allocation program is completed; in response to $w_1$ not reaching 1 and $w_2$ not reaching 0, recording a current optimal route result and returning to step 1; otherwise, selecting an optimal route from all recorded results as an output.

In an embodiment, the determining an optimal bus route configuration specifically includes:

step 1, in a situation that a bus stop suddenly receives a request Q of a passenger, determining, by a system, whether the bus stop has been traversed; in response to the bus stop having been not traversed, exiting a dynamic path planning strategy and performing a route allocation program; in response to the bus stop having been traversed, s=0 and Tag=0, where the variable s is a route, and the variable Tag indicates whether a request has been assigned to the route s, and in a situation that the request has been assigned to the route s, Tag=1; otherwise, Tag=0;

step 2, in a situation of considering all routes, determining whether the request Q is a bus reservation request; in response to the request Q being a bus reservation request, performing step 3; in response to the request Q being a bus reservation cancelation request, deleting the request Q from the route s;

step 3, calculating an average passenger travel distance and passenger experience from a bus stop where a bus is located to a requesting bus stop; determining whether a constraint condition is satisfied; in response to satisfying the constraint condition, recording calculation results, and setting the Tag to 1, which means that the requesting Q satisfies a condition for adding to the route s; in response to not satisfying the constraint condition, not recording the calculation results, and performing step 4; and step 4, determining whether all routes have been considered, in response to not all routes having been considered, returning to step 2; in response to all routes having been considered, continuing to determine whether the Tag is 1, if the Tag is 1, assigning the request Q to an optimal route s; if the Tag is not 1, rejecting the request Q, and dispatching an additional bus.

In an embodiment, the multi-objective path planning method further includes: sending the optimal bus route configuration to a passenger, thereby scheduling, by the passenger, a trip according to the optimal bus route configuration.

The disclosure has at least the following beneficial effects.

(1) A path planning algorithm BusNav suitable for multi-objective optimization is designed, which aims to applying to flexible bus scenarios. The algorithm can efficiently dispatch buses to meet the needs of different operating costs and passenger experience.

(2) A path extraction program and a route allocation program of the BusNav cooperate with each other, which can meet various conditions and dynamically allocate bus routes. This dynamic dispatching feature enables buses to adapt to real-time demand of passengers and road conditions more flexibly.

(3) By comparing with a traditional manual scheduling methods, such as a greedy method and a rapidly-exploring random tree (RRT) method, it is found that the BusNav is excellent in an average passenger travel (occupying) distance and passenger experience. This shows that the BusNav can reduce operating costs and significantly improve the experience of the passengers.

BRIEF DESCRIPTION OF DRAWINGS

Accompanying drawings, which constitute a part of the disclosure, are used to provide a further understanding of the disclosure. Illustrative embodiments of the disclosure and their descriptions are used to explain the disclosure, and do not constitute an improper limitation of the disclosure.

DETAILED DESCRIPTION OF EMBODIMENTS

Figure 1:
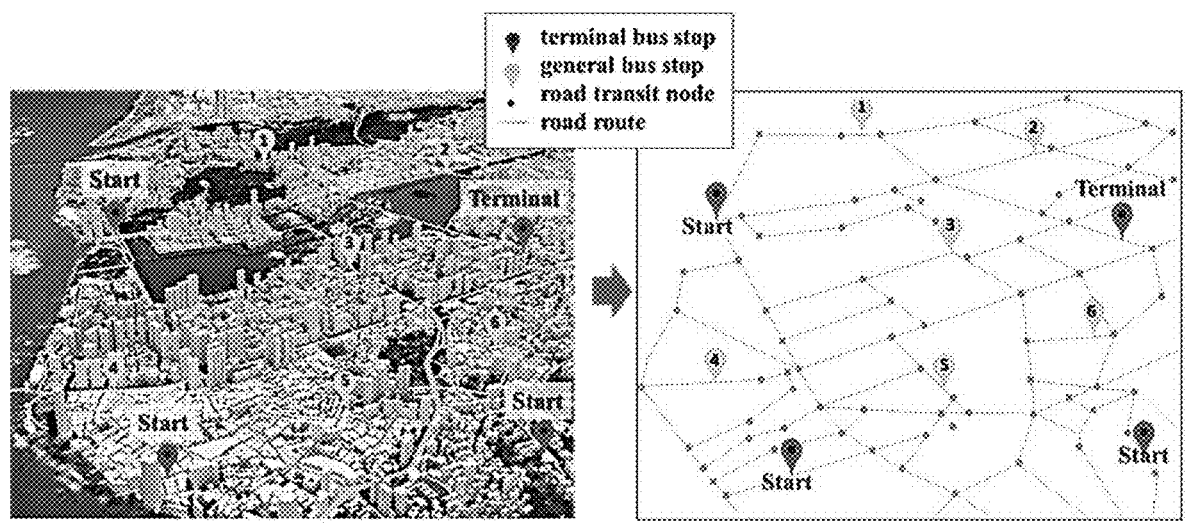
FIG. 1 illustrates an example of a bus route map of Xiamen City according to an embodiment of the disclosure.

It should be noted that the embodiments in the disclosure and the features in the embodiments can be combined with each other without conflict. The disclosure will be described in detail in combination with the accompanying drawings and the embodiments.

It should be noted that steps shown in flowcharts of the accompanying drawings may be executed in a computer system through a set of computer-executable instructions, and although a logical orders are shown in the flowcharts, in some cases, the steps shown or described may be executed in different orders.

An embodiment of the disclosure provides a multi-objective path planning method for an intelligent public transport system, which includes:

generating a shortest path network topology for connecting bus stops by analyzing a traffic network topology and bus drivable paths;

dynamically and evenly allocate bus routes according to passenger waiting periods, road lengths, and the shortest path network topology, to thereby allocate different routes for different buses; and determining an optimal bus route configuration according to average passenger travel (occupying) distances, passenger experience, and the bus routes.

A definition 1 is given: for a route s, a total path length τ(s) of the route s can be determined by adding path lengths one by one according to orders in which bus stops of the route s are traversed, and the total path length τ(s) is expressed in a formula 1 with a constraint condition expressed by a formula 2:

$$\tau(s) = \sum_{i=1}^{n} \sum_{j=1}^{n} d(i, j)\varphi_{i,j}; \quad (1)$$

$$\text{s.t.} \begin{cases} \sum_{i=1}^{n} \varphi_{i,j} = 1, \text{ where } j = 1, 2, 3 \ldots, n, v_i \in V \\ \sum_{j=1}^{n} \varphi_{i,j} = 1, \text{ where } i = 1, 2, 3 \ldots, n, v_j \in V, \\ \varphi_{i,j} \in \{0, 1\}, \text{ where } i, j = 1, 2, \ldots, n \end{cases} \quad (2)$$

where i and j represent adjacent bus stops, and d(i,j) represents a distance between the bus stop i and the bus stop j; if the bus stop j is the next bus stop of the bus stop i in the route s, a binary variable $\varphi_{i,j}$ takes a value of 1, otherwise $\varphi_{i,j}$ takes a value of 0; and n represents a total bus stop number in the route s.

A definition 2 is given: a total passenger number in the route s is expressed as P(s), which is obtained by adding a passenger number carried at each bus stop of the route s, which is expressed in a formula 3:

$$P(s) = \sum_{i=1}^{n} C(b)_{i,j}(s), \text{ where } i \in s, \quad (3)$$

where $C(b)_{i,j}(s)$ represents a passenger number carried at the bus stop i of a bus b.

A definition 3 is given: a passenger number on the bus b is variable, and can be determined by the passenger number carried at each bus stop of the route s. The passenger number on the bus b can be determined by a formula 4:

$$\sum_{v \in s}^{n} C(b)_{i+1,j}(s) = \sum_{v \in s}^{n} C(b)_{i,j}(s) + \sum_{v \in s}^{n} B(b)_{i,j}(s) - A(b)_i(s), \quad (4)$$

where $C(b)_{i,j}(s)$ represents a passenger number on the bus b when the bus b arrives the bus stop i, $B(b)_{i,j}(s)$ represents a passenger number corresponding to getting on the bus b at the bus stop i, $A(b)_i(s)$ represents a passenger number corresponding to getting off the bus b at the bus stop i, and the formula 4 is subjected to formulas 5, 6, and 7:

$$\text{s.t.} \begin{cases} \sum_{v \in s}^{n} B(b)_{i,j}(s) \leq \beta(b) - \sum_{v \in s}^{n} C(b)_{i,j}(s) & (5) \\ \sum_{v \in s}^{n} C(b)_{i,j}(s) \leq p_{i,j}(s) & (6) \\ \sum_{v \in s}^{n} C(b)_{i,j}(s) \geq A(b)_i(s) & (7) \end{cases}$$

where in the formula 5, β(b) represents a total passenger number capable of being carried by the bus b, and the total passenger number capable of being carried by the bus b minus a total passenger number carried between the bus stops i and j is greater than or equal to a total passenger number corresponding to getting on the bus b at the bus stops i and j; in the formula 6, a total passenger number carried the bus stops i and j is less than a waiting passenger number from the bus stop i to the bus stop j, and $p_{i,j}(s)$ represents a waiting passenger number at the bus stop i; and in the formula 7, a passenger number corresponding to getting on the bus b at the bus stop j is greater than or equal to the passenger number corresponding to getting off the bus b at the bus stop i.

A definition 4 is given: passenger average waiting period $WT_{avg}$ is expressed in a formula 8:

$$WT_{avg} = \frac{\sum_{i=1}^{k_1}(WT_r * \omega_r) + \sum_{j=1}^{k_2}(WT_s * \omega_s)}{k_1 + k_2}, \quad (8)$$

where $WT_r$ represents a waiting period of a regular period, $\omega_r$ represents a weight corresponding to $WT_r$, $WT_s$ represents a waiting period of a special period, $\omega_s$ represents a weight corresponding to $WT_s$; the special period can be determined according to business requirements or through big data analysis. In the disclosure, peak periods are 8 am to 9 am and 5 pm to 6 pm. $k_1$ and $k_2$ are variables, which represent a total passenger number in the regular period and a total passenger number in the specific period, respectively.

The calculation of the passenger average waiting period $WT_{avg}$ includes: dividing a waiting period into two periods, and calculating a weighted average waiting period of each of the two periods to obtain a first weighted average waiting period and a second weighted average waiting period. The first weighted average waiting period is obtained by: multiplying the waiting period $WT_r$ of the regular period and the corresponding weight $\omega_r$ to obtain a first item, and summing the first item corresponding to each passenger i from 1 to $k_1$. The second weighted average waiting period is obtained by: multiplying the waiting period $WT_s$ of the specific period and the corresponding weight $\omega_s$ to obtain a second item, and summing the second item corresponding to each passenger j from 1 to $k_2$. The first weighted average waiting period and the second weighted average waiting period are added, and then is divided by $k_1+k_2$ to obtain the passenger average waiting period $WT_{avg}$.

A definition 5 is given: a crowding degree $C_d(s)$ is defined according to a passenger number on a bus and a carrying capacity of the bus. Crowding will affect passenger experience. A less crowded route environment can provide a better passenger experience. In addition, the disclosure defines the crowding degree $C_d(s)$ as the passenger number $C(b)_{i,j}(s)$ on the bus b when the bus b arrives the bus stop i divided by the total passenger number β(b) capable of being carried by the bus b, which is expressed in a formula 9 subject to a formula (10);

$$C_d(s) = \frac{C(b)_{i,j}(s)}{\beta(b)}; \tag{9}$$

$$\text{s.t. } C_d(s) \le C_t(s), \forall s \in S, C_d(s) \in (0, +\infty), \tag{10}$$

where $C_t(s)$ represents a threshold, and this threshold is set to avoid seat crowding.

Defining Objective Functions

A first goal of the disclosure is to determine a bus route with the shortest path length in a route set S, where D(s) represents a route with the shortest distance in the route set S expressed in a formula 11 subject to a formula 12 for ensuring the optimization of passenger travel time, owing to a path length directly affecting the time taken by passengers to travel:

$$D(s) = \min\left(\sum_{i=1}^{n}\sum_{j=1}^{n} d(i,j)\varphi_{i,j}\right); \tag{11}$$

$$\text{s.t. } \varphi_{ij} = \{0,1\}, \forall s \in S, D(s) \in \mathbb{Q}^+. \tag{12}$$

According to the formulas 11 and 12, while minimizing a driving distance, the disclosure tries to combine two target values into one target, which is called an average passenger travel (occupying) distance function, that is, an average route length of each passenger in the route s, which is recorded as τp(s), as expressed in a formula 13:

$$\tau p(s) = \frac{\sum_{i=1}^{n}\sum_{j=1}^{n} d(i,j)\varphi_{i,j}}{\sum_{i=1}^{n} C(b)_{i,j}(s)} = \frac{\tau(s)}{P(s)}. \tag{13}$$

When τ(s) reaches a minimum value and P(s) reaches a maximum value, τp(s) reaches a minimum value, and this optimization standard achieves the goal of minimizing the operating cost.

Next, the disclosure defines a second goal of the disclosure, that is, a passenger experience function be(s), which is expressed in a formula 14:

$$be(s) = \frac{1}{WT_{avg} \times C_d(s)}, \tag{14}$$

where $WT_{avg}$ represents the passenger average waiting period, and $C_d(s)$ represents the crowding degree.

Because the waiting period and the crowding degree will affect the passenger experience. In the disclosure, it is expected to make a proper trade-off between the passenger average waiting period $WT_{avg}$ and the crowding degree $C_d(s)$. In order to comprehensively consider the influence of the passenger average waiting period and the crowding degree on the passenger experience, the passenger experience function be(s) is obtained.

A calculation method of a passenger waiting period is defined by formulas 15 and 16:

$$bt_v(s) - pt_v(s) \le wt(s) \tag{15};$$

$$\text{s.t. } \forall s \in S, v \in V \tag{16},$$

where $bt_v(s)$ represent time when a bus arrives at a bus stop v, $pt_v(s)$ represent time when a passenger arrives at the bus stop v, and wt(s) represents a waiting period tolerance of the passenger. A waiting period of each passenger does not exceed the specified threshold wt(s), and operators can dynamically adjust the specified threshold wt(s) and provide customized services for the specified threshold wt(s).

In a third goal of the disclosure, in order to reduce the operating cost, a passenger number per route should be maximized as much as possible, so as to reduce the number of routes and departures required, that is, to increase the passenger capacity of a bus on each route. The operating cost can be reduced by reducing the number of routes and departures required, as expressed in formulas 17 and 18:

$$\max(P(s)) = \max\left(\sum_{i=1}^{n} C(b)_{i,j}(s)\right); \tag{17}$$

$$\text{s.t. } \forall i \in s, s \in S. \tag{18}$$

At the same time, in order to reduce the operating cost, while meeting the travel needs of all passengers, a total bus number needed should be reduced as much as possible, as expressed in formulas 19 and 20:

$$\min(nb), \tag{19};$$

$$\text{s.t. } nb \ge 1, nb \in \mathbb{N} \tag{20}$$

where nb represents a total bus number, and a minimum value of nb is 1, that is, at least one bus needs to be dispatched.

From the route point of view, every route has its optimization objectives, namely τp(s) and be(s). Because all the routes have the same optimization goal, each route is independently optimized. That is to say, in each round, according to our optimization objectives τp(s) and be(s), a route is selected from candidate routes. Therefore, the optimization of each route is equivalent to the optimization of all routes. The multi-objective problem in the disclosure can be expressed in a formula 21:

$$\min(\tau p(s), 1/be(s), nb), \tag{21}.$$

s.t. Constraints formulas (2), (5), (6), (7), (10), (12), (16), (18), (20)

Data Structure

A bus route map can be defined as a directed graph G(V, E), where V is represents a set of bus stops and transit points, and V={$v_1$, ..., $v_n$}; E is a set of edges, E={e(u, v), where u, v∈V∧u #v}. A set of m bus routes can be expressed as ={$s_1, s_2, ..., s_m$}. A set of routes $s_k \in S$ can be expressed as r(s)={$v_i, ..., v_j$}, where $v_i$ represents a starting bus stop and $v_j$ represents a terminal bus stop.

FIG. 1 illustrates a route map from Xiamen bus stops to a subway stop (Xiamen North Stop). There are three starting bus stops, one terminal bus stop, which is a subway stop, and six general bus stops. Circle dots in the FIG. 1 are intersections of roads. The disclosure will find out three routes, which pass through all general bus stops, and finally reach the subway stop (terminal), where passengers can only take buses at six general bus stops or three starting bus stops. The minimum number of buses dispatched, the shortest path, and the passenger experience are met. In order to better describe a bus dispatching model of the disclosure, parameters and decision variables used in the bus dispatching model are summarize in Table 1.

When a map (also referred to as a traffic network topology) and bus stop information (also referred to as bus drivable routes) are given, they are transformed in to an adjacency matrix $M \in \mathbb{R}^{n+1 \times n+1}$ and the adjacency matrix not only records information of each bus $\mathbb{R}$ stop, but also records intersections of roads, and regards the intersections of roads as transit points. M is defined as an Euclidean distance pair between any two points, and a diagonal distance adjacency matrix M is 0, which is expressed in formulas 22 and 23. In addition, the adjacency matrix allows a road through which a bus cannot pass (for example, for regulation, maintenance, etc.) to be set to infinity in advance.

$$M = M^T \quad (22)$$

$$\text{Diag}(M) = 0 \quad (23)$$

The algorithm BusNav includes two clearly defined stages. In a first stage, a shortest route to each bus stop is calculated by using a path extraction program, and a shortest route connecting all bus stops is effectively established. In a second stage, considering a series of constraints, a route allocation program is adopted to determine a driving order between bus stops. The goal is to find a driving route that can meet a specified operating cost limit and ensure boarding experience of passengers.

TABLE 1

Parameters and decision variables used in the bus dispatching model

| Variable | Definition and description |
|---|---|
| $\tau(s)$ | Total path length of a route s |
| $d(i, j)$ | Distance from a bus stop i to a bus stop j |
| $\varphi_{i,j}$ | $\varphi_{i,j}$ represents a binary variable, if there is a path from a bus stop i to a bus stop j in a route s, $\varphi_{i,j}$ takes a value of 1, otherwise $\varphi_{i,j}$ takes a value of 0. |
| $P(s)$ | Total passenger number in a route s |
| S | A set of routes |
| s | A subset of the set of routes S |
| n | Total bus stop number |
| $C(b)_{i,j}(s)$ | In a route s with a terminal bus stop j, a passenger number carried by a bus b when the bus b arrives at a bus stop i. |
| $B(b)_{i,j}(s)$ | In a route s with a terminal bus stop j, a passenger number corresponding to getting on a bus b at a bus stop i. |
| $A(b)_i(s)$ | In a route s, a passenger number corresponding to getting off a bus b at a bus stop i. |
| $P_{i,j}(s)$ | In a route s with a terminal bus stop j, a waiting passenger number at a bus stop i. |
| nb | Total bus number |
| $D(s)$ | Route s with a shortest path length |
| $\beta(b)$ | Maximum capacity of a bus b |
| $bt_v(s)$ | In a route s, time when a bus arrives at a stop v |
| $pt_v(s)$ | In a route s, time when a passenger arrives at the stop v |
| $WT_{avg}$ | Passenger average waiting period |
| $WT_r$ | Waiting period of a regular period |
| $WT_s$ | Waiting period of a special period |
| $wt(s)$ | Upper limit (threshold) of a waiting period of each passenger |

In the first stage of path planning, paths must be extracted first. In this path extraction program, some unnecessary paths can be filtered or removed, aiming at reducing the calculation amount of data. In order to achieve this, Floyd algorithm is used in a path extraction process, and the Floyd algorithm is good at calculating a shortest distance between any two bus stops. The Floyd algorithm is based on the principle of dynamic programming skills and a greedy method. The Floyd algorithm regards $\text{dist\_var}_{w,v,k}$ as a shortest path length from a node w to a node v, and only contains a set $(1, \ldots, k)$ as transit nodes. In the Floyd algorithm, a decision to update a path length can be divided into the following two situations.

In a formula 24, if a shortest path passes through a transit node k and produces a shorter path length, a path length and path information are updated:

$$\text{dist\_var}_{w,v,k} = \text{dist\_var}_{w,k,k-1} + \text{dist\_var}_{k,v,k-1} \quad (24)$$

Otherwise, the path is not updated, and the original path is maintained, as shown in a formula 25:

$$\text{dist\_var}_{w,v,k} = \text{dist\_var}_{w,v,k-1} \quad (25)$$

Therefore, with the above relationships, the formulas 24 and 25 can be rewritten as a formula 26:

$$\text{dist\_var}_{w,v,k} = \min(\text{dist\_var}_{w,v,k-1}, \text{dist\_var}_{w,k,k-1} + \text{dist\_var}_{k,v,k-1}) \quad (26)$$

Figure 2:
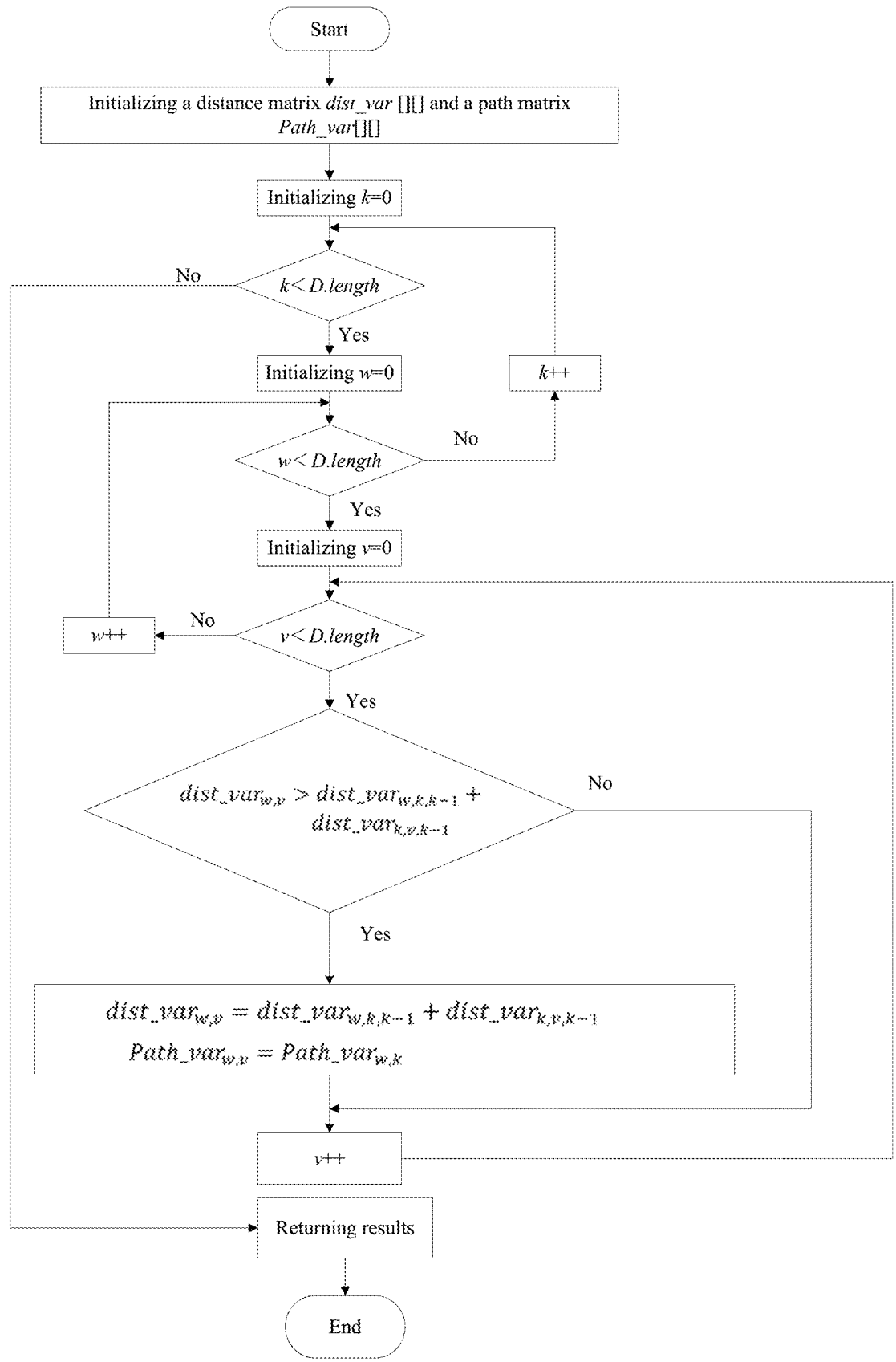
FIG. 2 illustrates a schematic flow diagram of a path extraction program according to an embodiment of the disclosure.

In the process of finding the shortest path between any two stops by the Floyd algorithm, we can remove or filter out some unnecessary paths. There are multiple transit points between bus stops, if we can remove these unnecessary transit points in advance, it will be helpful to improve a calculation speed. The time complexity of the Floyd algorithm is O(n3), so the more the number of transit points, the higher its time complexity. Therefore, we should remove the inapplicable transit points in the first stage to reduce a calculation amount. FIG. 2 illustrates the schematic flow diagram of a path extraction program.

After determining the shortest path between any two bus stops, it is necessary to plan a driving path trajectory from the starting bus stop to the terminal bus stop. In order to reduce operating cost, minimizing the driving path length is our goal. A length of a driving route and the number of departures have an impact on the operating cost. The passenger experience will be affected by the waiting period and the crowding degree. In order to allocate optimal bus stops and an optical driving sequence for each bus, we define a stop evaluation index (X), which is a sum of a result of multiplying an average passenger travel (occupying) distance by a weight $w_1$ and a result of multiplying a passenger experience value by a weight $w_2$. The stop evaluation index is a key index of whether a stop is received in a route, and is expressed in a formula 27:

$$\lambda = \tau p(s) \times w_1 + be(s) \times w_2$$

$$\text{s.t. } w_1 + w_2 = 1 \quad (27)$$

Steps of the route allocation program of the algorithm BusNav are as follows.

Figure 3:
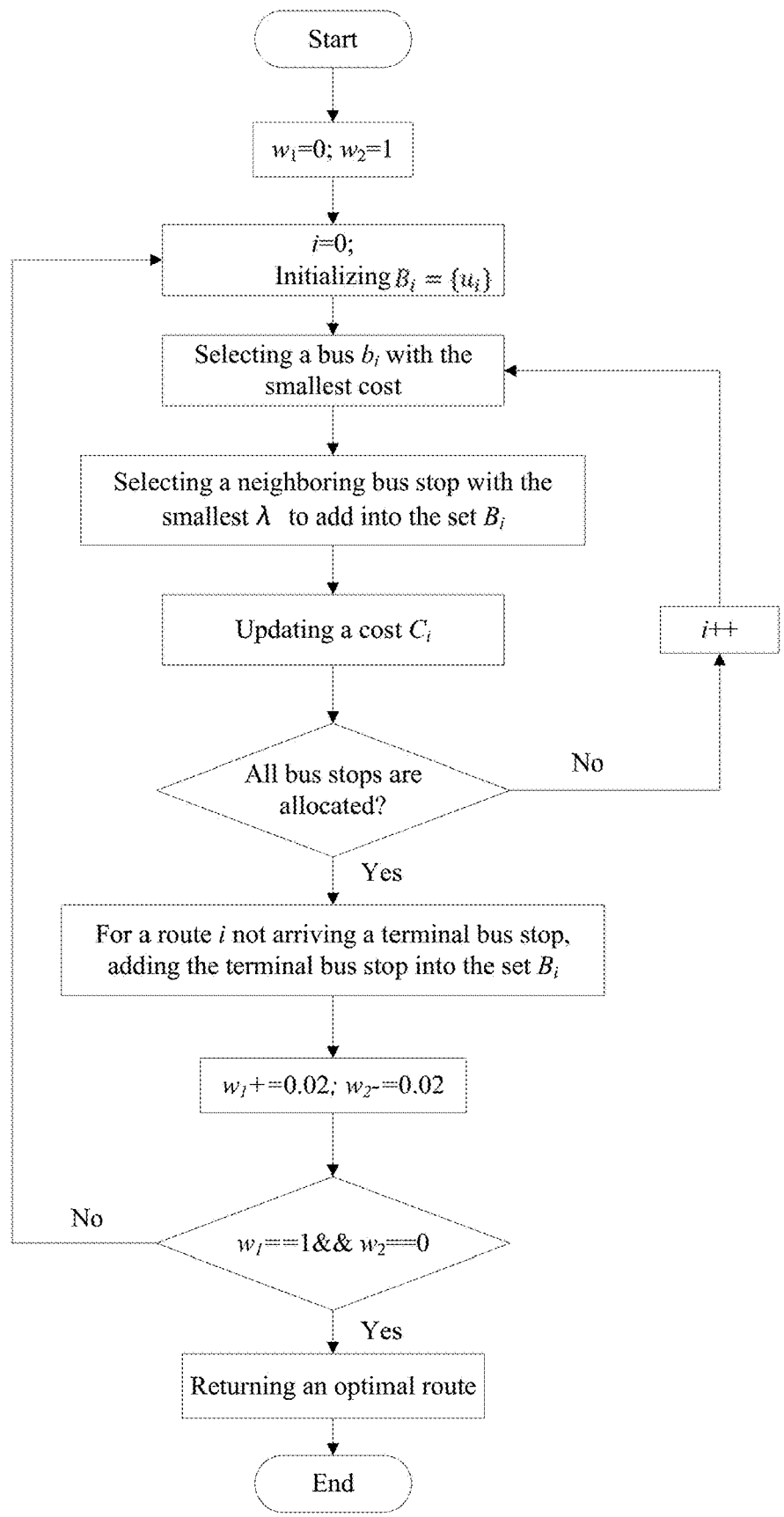
FIG. 3 illustrates a schematic diagram of a route allocation program according to an embodiment of the disclosure.

First of all, an initialization process is performed to make $w_1 = 0$ and $w_2 = 1$ (where $w_2 = 1 - w_1$), where an increment of $w_1$ is 0.02, a decrement of $w_2$ is 0.02. i is an identifier (ID) of a bus, and each bus set $B_i(1 \leq i \leq nb)$ records its own path trajectory, and only a starting bus stop is recorded in an initial state, $B_i = \{u_i\}$. In order to make the operations of all buses be evenly distributed, each bus is set with a cost $C_i$, which records a total distance of a route, where an initial state of $C_i$ is 0. FIG. 3 illustrates a schematic diagram of the route allocation program, which includes steps 1-5.

In the step 1, a bus with the smallest cost $C_i$ is selected, which has a highest priority when selecting a bus stop. Since a cost of each bus is 0 at first, if costs of at least two buses are the same, a bus with the smallest ID of the at least two buses will have priority to select a bus stop. For each bus, a node v with a minimum stop evaluation index λ is selected from unselected adjacent bus stops, and the node v is assigned to a bus set $B_i$. Here, α(s) represents a threshold, and the value of τp(s) affects an operating cost of the bus. Larger τp(s) leads to a higher operating cost for bus companies, while smaller τp(s) leads to a smaller operating cost. A formula 28 represents the calculation method of the operating cost:

$$\tau p(s) = \frac{\sum_{i=1}^{n}\sum_{j=1}^{n} d(i,j)x_{i,j}}{\sum_{i=1}^{n} C(b)_{i,j}(s)} = \frac{\tau(s)}{P(s)} \quad (28)$$

s.t. $\tau p(s) \leq \alpha(s)$

In the stop evaluation index λ, there is another goal to consider, which is the passenger experience. A selected bus stop should have the passenger experience be(s), which is greater than or equal to an experience threshold γ(s). In other words, a smaller crowding degree or a shorter average waiting period corresponds to a better passenger experience. The passenger experience value be(s) is expressed in a formula 29:

$$be(s) = \frac{1}{WT_{avg} \times C_d(s)} \quad (29)$$

s.t. $be(s) \geq \gamma(s)$.

A bus $b_p$ with the smallest cost $C_i$ has the highest selection priority. If costs of at least buses are the same, a higher selection priority is given to a bus with the smallest ID, which is shown in a formula 30:

$$\min(C_i), \text{ where } 1 \leq p \leq nb \quad (30)$$

In the step 2, the bus $b_p$ with the highest selection priority selects the bus stop with the minimum stop evaluation index λ from adjacent bus stops and adds it to a set $B_p$, as expressed in a formula 31:

$$B_p = \{v|\min(\lambda)\} \quad (31)$$

In the step 3, a cost $C_p$ of the bus $b_p$ is updated, where len represents a total node number in the set $B_p$, and len=$|B_p|$. A total distance of a route is set as the cost $C_p$ of the bus $b_p$, as expressed in a formula 32:

$$C_p = \sum_{j=1}^{len} \text{cost}(dist(u,v)). \quad (32)$$

In the step 4, when all bus stops have been allocated, if there is a route still that has not yet reached a destination bus stop, the destination bus stop is directly added to this route, that is, a round of route allocation process is completed, and the step 5 is performed. When there is at least one bus stop is not allocated, the process returns to the step 1. The advantage of this design is to avoid the problem that the same bus bears all the workload, and ensure fairer work distribution, more efficient resource utilization and better overall balance.

In the step 5, The initial value of $w_1$ is 0 and $w_1$ is increased by 0.02 each time until it reaches 1. At the same time, the initial value of $w_2$ is 1 and $w_2$ is decreased by 0.02 each time until it reaches 0. Finally, an optimal route result is taken as a final path planning result, that is, the whole route allocation program is completed. If $w_1$ has not reached 1 and $w_2$ has not reached 0, a current optimal route result is recorded and the process returns to the step 1; otherwise, an optimal route is selected from all recorded results as an output.

In order to clearly explain the process of the route allocation program, an example of the route allocation program is described below. Take FIG. 4(a) as an example, it is assumed that there are three starting bus stops, namely $u_1$, $u_2$ and $u_3$. Three buses $b_1$, $b_2$ and $b_3$ are respectively assigned to the three starting bus stops $u_1$, $u_2$ and $u_3$. The three buses start from the starting bus stops and finally arrive at a bus terminal T. Except the starting bus stops, at least one bus passes through each transfer bus stop. In an initial state of each bus, $B_i = \{u_i\}$, and $C_i = 0$. First, each bus $b_i$ finds a node with the minimum stop evaluation index λ from adjacent bus stops and adds it to the set $B_i$.

Since a cost $C_i$ of each bus at the beginning of the program is 0, all buses have the right to select a bus stop. At present, the bus $b_1$ selects a bus stop $v_4$ with the minimum stop evaluation index $\lambda_{1,4}$, the bus $b_2$ selects a bus stop $v_s$ with the minimum stop evaluation index $\lambda_{2,5}$, and the bus $b_3$ selects a bus stop $v_6$ with the minimum stop evaluation index $\lambda_{3,6}$. It is assumed that their corresponding distances are 5, 4 and 6 respectively, costs of the buses in a first round are $C_1=5$, $C_2=4$ and $C_3=6$ respectively. The result is shown in FIG. 4(a).

Figure 4A:
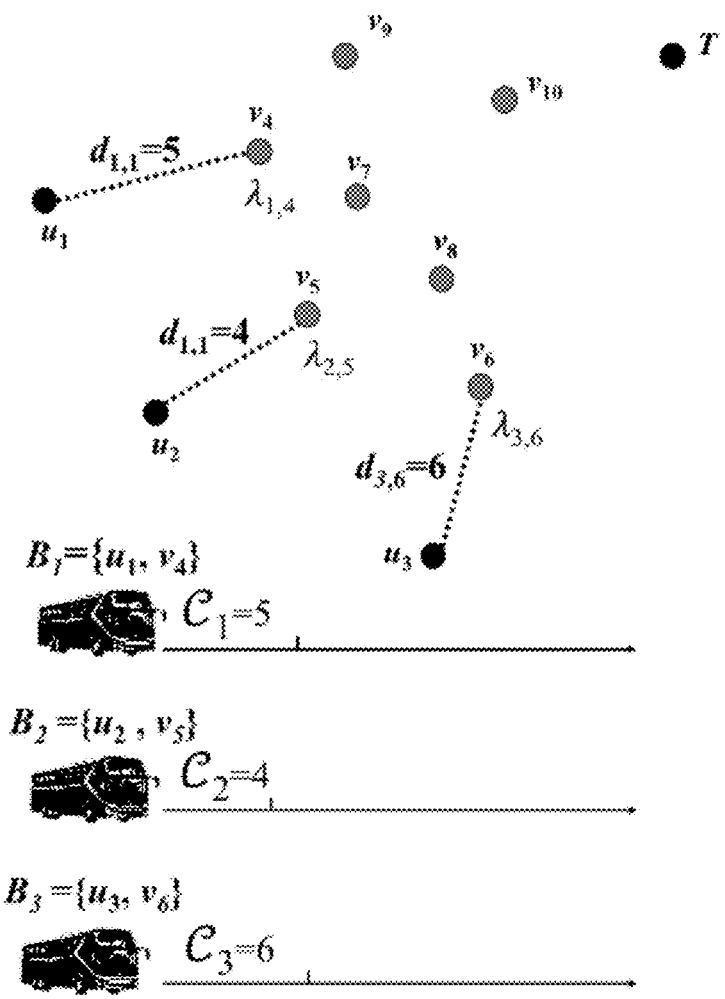
FIG. 4(a) illustrates a schematic diagram of an initial state of an embodiment of the disclosure.

In FIG. 4(a), since the costs of the three buses are 0 at the beginning of the program, each bus has the priority to select the bus stops at the same time, and its adjacent bus stops are added to their respective sets $B_i$, where the corresponding costs are 5, 4 and 6.

Figure 4B:
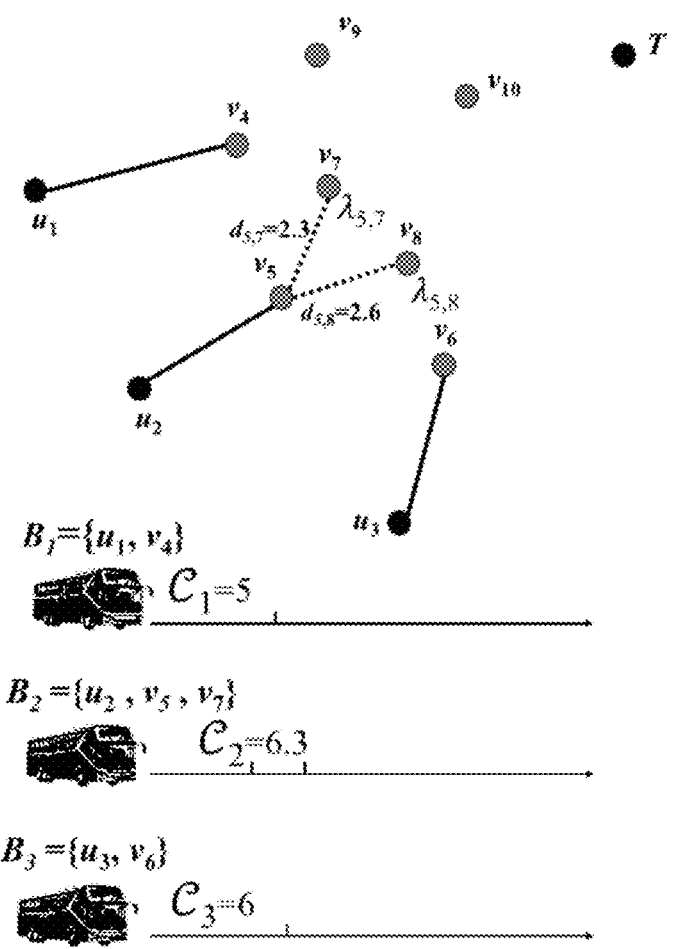
FIG. 4(b) illustrates a schematic diagram of a second round of the embodiment of the disclosure.
Figure 4:
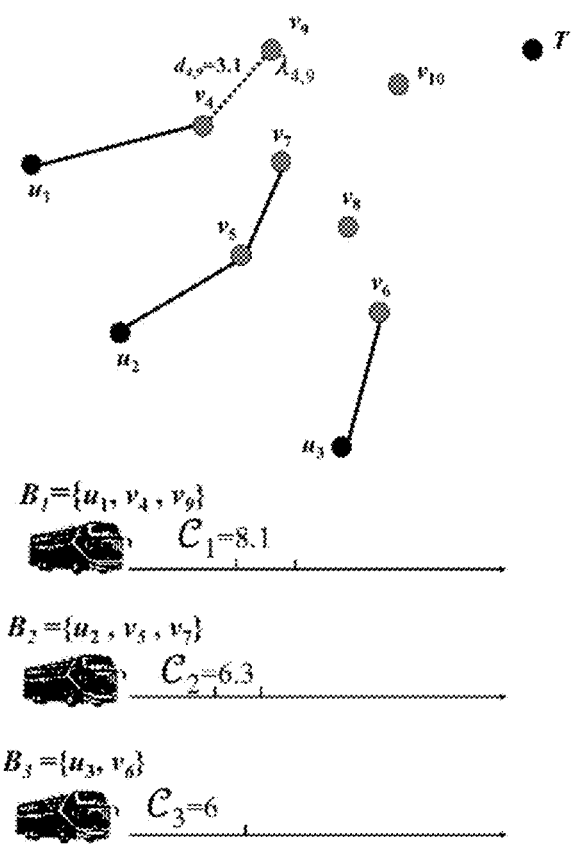
FIG. 4(c) illustrates a schematic diagram of a third round of the embodiment of the disclosure.

In a second round, because the cost of the bus $b_2$ is the smallest, the bus $b_2$ has the priority to select a bus stop. The bus $b_2$ selects a node with the minimum stop evaluation index λ among adjacent nodes to join a set $B_2$, as shown in FIG. 4(b). If stop evaluation indexes X corresponding to adjacent nodes $v_7$ and $v_8$ are $\lambda_{5,7}=3.2$ and $\lambda_{5,8}=3.6$, then the node $v_7$ is added to the set $B_2$. It is assumed that a distance from point $v_s$ to $V_7$ is 2.3, the cost of the bus $b_2$ after updating is updated to $C_2=4+2.3=6.3$.

In FIG. 4(b), because the cost of the bus $b_2$ is the smallest, the bus $b_2$ has the selection priority and $v_7$ is added to the set $B_2$, in which the corresponding distance $d_{5,7}$ and $d_{5,8}$, are 2.3 and 2.6 respectively.

In a third round, Because the cost ($C_1=5$) of the bus $b_1$ is the smallest, the bus $b_1$ has the selection priority, as shown in FIG. 4(c). $b_1$ selects a node with the minimum stop evaluation index λ ($\lambda_{4,9}$) from adjacent nodes to join the set $B_1$. It is assumed that a distance from point $v_4$ to $v_9$ is 3.1, the cost of the bus $b_1$ after updating is updated to $C_1=5+3.1=8.1$. Until all bus stops are allocated, if there is a route still that has not yet reached a destination bus stop, the destination bus stop is directly added to this route, that is, the whole route allocation process is completed.

In FIG. 4(c), because the cost of the bus $b_1$ is the smallest, the bus $b_1$ has the selection priority and $v_9$ is added to the set $B_1$, in which the corresponding cost, the distance $d_{4,9}$ is 3.1.

However, in the above process, the route allocation program is a one-time allocation process. In the disclosure, a map on which a route planning process is performed is taken as an input, $w_1$ is increased from 0 to 1, and $w_2$ is decreased from 1 to 0, and the optimal τp(s) and be(s) are found as the final results.

In an actual application, when a passenger suddenly makes a reservation or cancels a route, a BusNav system needs to monitor a reservation condition of the passenger in real time and make the arrangement of route planning in time. Through the communication between the passenger and a driver and the real-time update of a system database, the BusNav system obtains information of confirmed reservations, cancelled routes and new reservation requirements.

In order to deal with these emergencies, the BusNav system introduces a dynamic path planning strategy in the route allocation process. The route can be flexibly adjusted to meet the needs of passengers. When passengers cancel reservations, the BusNav system only needs to subtract the number of the passengers who cancel reservations from a total passenger number at a corresponding bus stop. This ensures that the passenger number at each bus stop is updated in time during the route allocation process. The dynamic path planning strategy includes steps 1-4.

In the step 1, when a bus stop suddenly receives a request Q of a passenger, the BusNav system will determine whether the bus stop has been traversed. If the bus stop has not been traversed, the dynamic path planning strategy exits and the route allocation program is performed. If the bus stop has been traversed, s=0 and Tag=0, where the variable s is a route, and the variable Tag indicates whether a request has been assigned to the route s, and if the request has been assigned to the route s, Tag=1; otherwise, Tag=0.

In the step 2, in a situation of considering all routes, whether the request Q is a bus reservation request is determined, if the request Q is a bus reservation request, the step 3 is performed, if the request Q is a bus reservation cancelation request, a bus stop corresponding to the request Q is deleted from the route s.

In the step 3, an average passenger travel (occupying) distance and passenger experience from a bus stop where a bus is located to a requesting bus stop are calculated, and whether the constraint conditions are met is determined. If the constraint conditions are met, the calculation results are recorded, and the Tag is set to 1, which means that the requesting bus stop corresponding to the requesting Q meets the conditions of being added to the route s; otherwise, the calculation results are not recorded, and the step 4 is performed.

Figure 5:
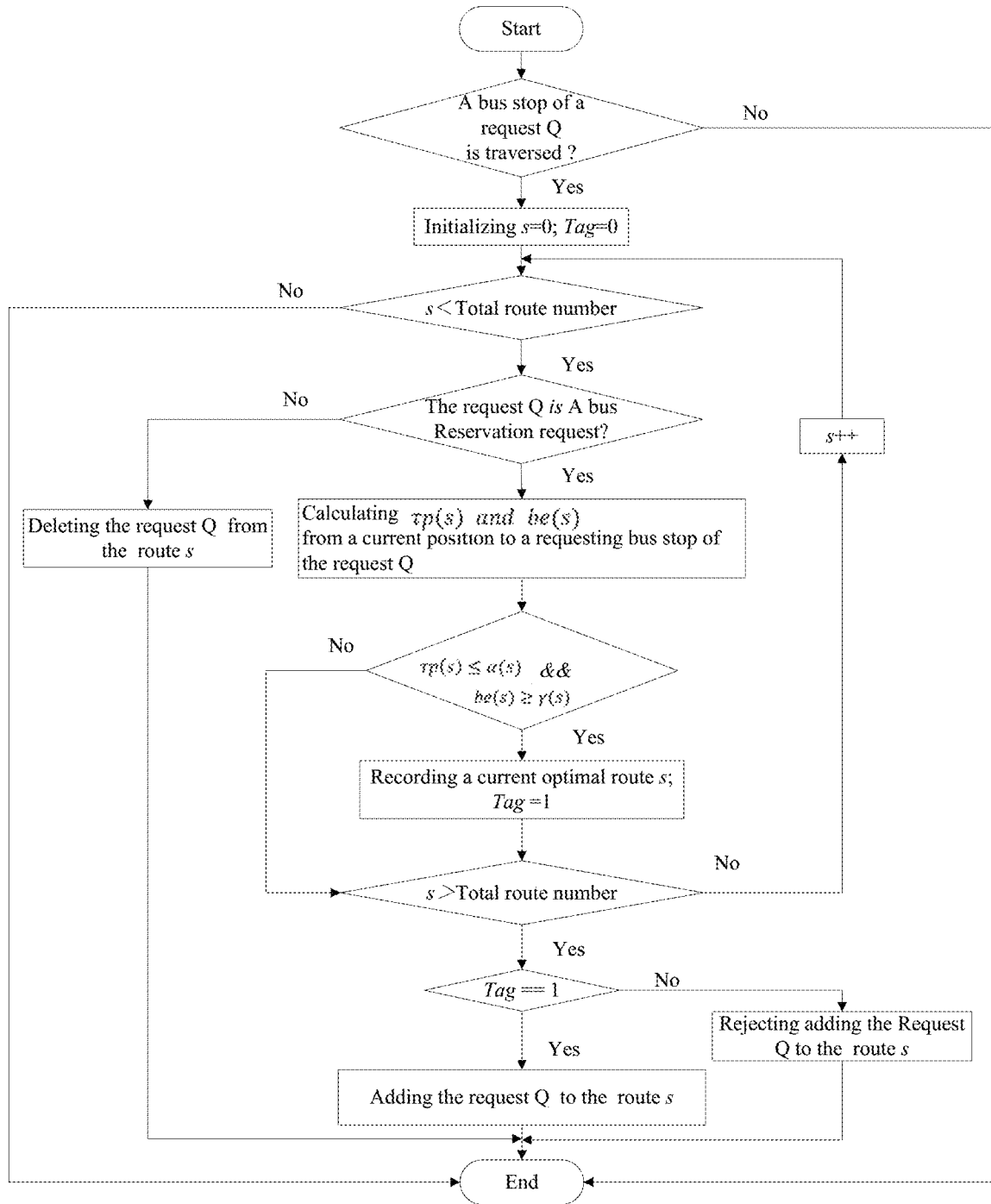
FIG. 5 illustrates a schematic diagram of a dynamic path planning strategy according to an embodiment of the disclosure.

In the step 4, it is determined whether all the routes have been considered, if not, the process returns to the step 2, if yes, continues to determine whether the Tag is 1, and if the Tag is 1, the request Q is finally assigned to the optimal route s; otherwise, the request Q is rejected, and an additional bus must be dispatched at this time to meet the demand of the passenger. FIG. 5 illustrates a schematic diagram of the dynamic path planning strategy.

The above is merely exemplary embodiments of the disclosure, but the scope of protection of the disclosure is not limited thereto. Any change or replacement that can be easily thought of by a person familiar with this technical field within the technical scope disclosed in the disclosure should be included in the scope of protection of the disclosure. Therefore, the scope of protection of the disclosure should be based on the scope of protection of claims.

What is claimed is:

1. A multi-objective path planning method for a public transport system, comprising:
    generating a shortest path network topology for connecting bus stops by analyzing a traffic network topology and bus drivable paths;
    dynamically and evenly allocate bus routes according to passenger waiting periods, road lengths, and the shortest path network topology, to thereby allocate different routes for different buses; and
    determining an optimal bus route configuration according to average passenger travel distances, passenger experience, and the bus routes;
    wherein the multi-objective path planning method for a public transport system further comprises: sending the optimal bus route configuration to a passenger, thereby scheduling, by the passenger, a trip according to the optimal bus route configuration;
    wherein the determining an optimal bus route configuration specifically comprises:
        step 1, in a situation that a bus stop suddenly receives a request Q of the passenger, determining, by a system, whether the bus stop has been traversed; in response to the bus stop having been not traversed, exiting a dynamic path planning strategy and performing a route allocation program; in response to the bus stop having been traversed, s=0 and Tag=0, where the variable s is a route, and the variable Tag indicates whether a request has been assigned to the route s, and in a situation that the request has been assigned to the route s, Tag=1; otherwise, Tag=0;
        step 2, in a situation of considering all routes, determining whether the request Q is a bus reservation request; in response to the request Q being a bus reservation request, performing step 3; in response to the request Q being a bus reservation cancelation request, deleting the request Q from the route s;
        step 3, calculating an average passenger travel distance and passenger experience from a bus stop where a bus is located to a requesting bus stop; determining whether a constraint condition is satisfied; in response to satisfying the constraint condition, recording calculation results, and setting the Tag to 1, which means that the request Q satisfies a condition for adding to the route s; in response to not satisfying the constraint condition, not recording the calculation results, and performing step 4; and
        step 4, determining whether all routes have been considered, in response to not all routes having been considered, returning to step 2; in response to all routes having been considered, continuing to determine whether the Tag is 1, if the Tag is 1, assigning the request Q to an optimal route; if the Tag is not 1, rejecting the request Q, and dispatching an additional bus;
    wherein the dynamically and evenly allocate bus routes according to passenger waiting periods, road lengths, and the shortest path network topology, to thereby allocate different routes for different buses specifically comprises:
        step 21, selecting a bus $b_p$ with the smallest cost $C_i$, which has a highest priority when selecting a bus stop;
        step 22, selecting, by the bus $b_p$ with the highest selection priority, the bus stop with the minimum stop evaluation index λ from adjacent bus stops and adding the bus stop with the minimum stop evaluation index λ to a set $B_p$;

step 23, updating a cost $\mathcal{C}_p$, of the bus $b_p$;

step 24, in a situation that all bus stops have been allocated, if there is a route still that has not yet reached a destination bus stop, adding directly the destination bus stop to the route, and performing step 25; in a situation that there is at least one bus stop is not allocated, returning to step 21; and step 25, increasing $w_1$ with an initial value of 0 by 0.02 each time until $w_1$ reaches 1; decreasing $w_2$ 0.02 with an initial value of 1 each time until $w_2$ reaches 0; taking an optimal route result as a final path planning result, that is, a whole route allocation program is completed; in response to $w_1$ not reaching 1 and $w_2$ not reaching 0, recording a current optimal route result and returning to step 21; otherwise, selecting an optimal route from all recorded results as an output.

2. The multi-objective path planning method for a public transport system as claimed in claim 1, comprising:

for the route s, determining a total path length τ(s) of the route s by adding path lengths one by one according to orders in which bus stops of the route s are traversed; where the total path length τ(s) is expressed in a formula 1 with a constraint condition expressed by a formula 2:

$$\tau(s) = \sum_{i=1}^{n} \sum_{j=1}^{n} d(i, j)\varphi_{i,j}; \quad (1)$$

$$\text{s.t.} \begin{cases} \sum_{i=1}^{n} \varphi_{i,j} = 1, \text{ where } i, j = 1, 2, 3, \ldots, n, v_i \in V \\ \sum_{j=1}^{n} \varphi_{i,j} = 1, \text{ where } i, j = 1, 2, 3, \ldots, n, v_j \in V, \\ \varphi_{i,j} \in \{0, 1\}, \text{ where } i, j = 1, 2, \ldots, n \end{cases} \quad (2)$$

where i and j represent adjacent bus stops, and d(i, j) represents a distance between the bus stop i and the bus stop j; if the bus stop j is the next bus stop of the bus stop i in the route s, a binary variable $\varphi_{i,j}$ takes a value of 1, otherwise $\varphi_{i,j}$ takes a value of 0; and n represents a total bus stop number in the route s.

3. The multi-objective path planning method for a public transport system as claimed in claim 1, wherein a total passenger number in the route s is expressed as P(s), which is obtained by adding a passenger number carried at each bus stop of the route s, and is expressed in a formula 3:

$$P(s) = \sum_{i=1}^{n} C(b)_{i,j}(s), \text{ where } i \in s, \quad (3)$$

where $c(b)_{i,j}(s)$ represents a passenger number carried at a bus stop i of a bus b in the route s with a terminal bus stop j, and n represents a total bus stop number in the route s.

4. The multi-objective path planning method for a public transport system as claimed in claim 1, wherein a passenger number on a bus b is variable, and is determined by a passenger number carried at each bus stop of the route s; and the passenger number on the bus b is determined by a formula 4:

$$\sum_{v \in s}^{n} C(b)_{i+1,j}(s) = \sum_{v \in s}^{n} C(b)_{i,j}(s) + \sum_{v \in s}^{n} B(b)_{i,j}(s) - A(b)_i(s), \quad (4)$$

where $C(b)_{i,j}(s)$ represents a passenger number on the bus b when the bus b arrives a bus stop i in the route s with a terminal bus stop j, $B(b)_{i,j}(s)$ represents a passenger number corresponding to getting on the bus b at the bus stop i in the route s with a terminal bus stop j, and $A(b)_i(s)$ represents a passenger number corresponding to getting off the bus b at the bus stop i.

5. The multi-objective path planning method for a public transport system as claimed in claim 1, comprising: obtaining a passenger average waiting period $WT_{avg}$, comprising:

dividing a waiting period into two periods including a regular period and a specific period, and calculating a weighted average waiting period of each of the two periods to obtain a first weighted average waiting period and a second weighted average waiting period; wherein the first weighted average waiting period is obtained by: multiplying a waiting period $WT_r$ of the regular period and a corresponding weight $\omega_r$ to obtain a first item, and summing the first item corresponding to each passenger i from 1 to $k_i$; and the second weighted average waiting period is obtained by: multiplying a waiting period $WT_s$ of the specific period and a corresponding weight $\omega_s$ to obtain a second item, and summing the second item corresponding to each passenger j from 1 to $k_2$;

adding the first weighted average waiting period and the second weighted average waiting period, and then is divided by $k_1+k_2$ to thereby obtain the passenger average waiting period $WT_{avg}$.

6. The multi-objective path planning method for a public transport system as claimed in claim 1, comprising: obtaining a crowding degree $c_d(s)$ expressed in a formula 9 subject to a formula (10):

$$C_d(s) = \frac{C(b)_{i,j}(s)}{\beta(b)}; \quad (9)$$

$$\text{s.t. } C_d(s) \leq C_t(s), \forall s \in S, C_d(s) \in [0, +\infty), \quad (10)$$

where $C_t(s)$ represents a threshold, $C(b)_{i,j}(s)$ represents a passenger number on a bus b when the bus b arrives a bus stop i in the route s with a terminal bus stop j, the route s is a subset of a set of routes S, and $\beta(b)$ represents a maximum capacity of bus b.

* * * * *